3,541,040
ANTIFOG POLYOLEFIN FILM
Frank Edisha Eastes, Spartanburg, Alfred Paul Engelmann, Greenville, and Samuel Ervin Laird, Mauldin, S.C., assignors to W. R. Grace & Co., Duncan, S.C., a corporation of Connecticut
No Drawing. Filed June 28, 1968, Ser. No. 741,211
Int. Cl. C08f 45/36, 45/34
U.S. Cl. 260—31.6
10 Claims

ABSTRACT OF THE DISCLOSURE

An antifogging polyolefin film produced from a mixture comprising polyolefin resin, sodium dioctyl sulfosuccinate, glycerol monostearate, and the reaction product of lauryl alcohol and ethylene oxide.

---

This invention relates to an antifogging polyolefin film. The invention relates specifically to polyolefin film especially adapted for wrapping moisture containing and moisture emitting products such as fresh meats, poultry, fresh vegetables and the like that are subjected to refrigeration while wrapped.

It has become a widespread supermarket practice to display freshly cut meats and other produce as individually wrapped items in films of transparent plastic materials. These wrapped products are visible through the packaging material and, therefore, it is important that the package should be attractive and the inner surface of the plastic wrapping material should be resistant to fogging under conditions of extended refrigeration. Furthermore, the meat, poultry, or other products encased in such a package must remain fresh and retain their color during wrapping, display, and storage. For example, when used to encase freshly cut red meats, the package wrapping material should transmit oxygen at a rate sufficient to retain the red color or "bloom" of the meat.

The film must also be capable of being readily and tightly sealed, preferably by heat, to substantially prevent leakage of moisture and juices contained in the package. The wrapping film must also be flexible and tough and must not become brittle or tear or crack during its use.

Many polyolefin films inherently possess certain desired qualities, including high permeability to oxygen, low water permeability, and excellent low temperature sealability. Transparent polyolefin film offers a good material for use in such packaging.

Because of other inherent properties of polyolefin films, principally the hydrophobic characteristics of the films' surface, after moisture-containing products are encased therein water vapor condenses rapidly; and the vapor collects and remains on the inner surface of the film as droplets of water thus resulting in fogging and serious impairment of transparency. In particular, it has been noticed that such condensation occurs more noticeably when the wrapped, moisture-containing products are subjected to temperature changes such as refrigeration after having been packaged. Subsequent temperature cycles would also produce the fogging effect in a more pronounced fashion. Therefore, it is an object of the present invention to provide an antifogging polyolefin packaging film.

It is another object of the present invention to provide an antifogging film which will retain its antifogging ability for extended periods of time through temperature cycles.

It is yet another object of the present invention to provide a suitable wrapping material for moisture-emitting or moisture-containing food products which has a sufficient oxygen transmission rate.

These and other objects are accomplished by the present invention wherein it has been found that the three ingredients listed below have a surprising synergistic effect in greatly improving the antifog characteristics of polyolefin film when incorporated directly in the mixture with the polyolefin resin in the process of manufacturing film. These three ingredients and their preferred percentages by weight in the mixture with the polyolefin resin are as follows:

(1) 0.25 to 4% of the reaction product of a $C_8$ to $C_{18}$ alcohol and 2 to 5 moles of ethylene oxide with an aliphatic alcohol preferred. The structural formula of the reaction product is $CH_3(CH_2)_x—CH_2(OCH_2—CH_2)_yOH$ wherein $x$ is an integer from 6 to 16 and $y$ is an integer from 2 to 5. A preferred compound is obtained by reacting three moles of ethylene oxide with lauryl alcohol. This ingredient will also be referred to hereinafter as eth-oxylated lauryl alcohol.

(2) 0.1% to 2% of a $C_{12}$ to $C_{18}$ fatty acid monoester of a polyhydric alcohol, such as glycerol ester including glyceryl mannitan laurate. Preferred compounds are glyceryl monostearate and triglyceryl monostearate.

(3) 0.05% to 0.75% of an alkali metal salt of a $C_5$ to $C_{10}$ diester of sulfosuccinic acid. Sodium dioctyl sulfosuccinate is a preferred compound.

The balance of the mixture will be polyolefin resin, pigments, slip agents, antiblock agents, etc. When the maximum concentrations of the above listed ingredients are used the minimum polyolefin weight percentage will be approximately 94%. Slip agents and antiblock agents are normally incorporated in minor weight percentages in the film concentration. For example, erucamide in a few tenths of a percent, generally less than 0.200 wt. percent, is an effective slip agent; and finally divided silica gel in concentrations of less than two-tenths of a percent serves as an antiblock agent.

The invention is applicable to polyolefin films, especially alpha monoolefins of 2 to 8 carbon atoms per molecule generally and specifically to polyethylene. Polyethylenes of all densities may be used, that is, the synergistic effects will be exhibited by the above ingredients in polyethylene having high, medium or low density. Also, the invention is applicable to both cross-linked and non-cross-linked polyethylene. However, the invention is not limited to polyethylene but includes polymers of ethylene, propylene, butene-1 and the like and mixtures thereof. In general, the invention is applicable to polymers of olefins.

The term "polymer" as used herein includes homopolymers, copolymers, terpolymers, block copolymers, and the like.

A preferred embodiment of the present invention is illustrated in the following example in which a batch was prepared by putting the ingredients listed below into a Banbury mixer:

| Ingredient | Percent | Function |
|---|---|---|
| Polyethylene (0.922 density) | 98.005 | Base resin. |
| Eth-oxylated lauryl alcohol | 1.000 | Anti-fog. |
| Glyceryl monostearate | 0.500 | Anti-fog. |
| Sodium dioctyl sulfosuccinate | 0.375 | Anti-fog. |
| Erucamide | 0.080 | Slip agent. |
| Finely divided silica gel [1] | 0.040 | Antiblock. |

[1] Syloid-85, Davison Chemical Company, Baltimore, Maryland.

After the above ingredients were placed in the Banbury mixer they were thoroughly mixed. The mixture was then fed to an extruder where the extrudate was extended through an annular die and collapsed into tape form. After cooling, the tape was cross-linked by irradiation to a dosage of 8 megarads. Next, the tape was biaxially oriented by blowing in the conventional bubble technique to form a film. The method of preparing film by extruding a tube, irradiating and then biaxially orienting the tube by the bubble technique is described in U.S. Pat. 3,022,543 issued to W. G. Baird, Jr. et al.

A simple test for determining the anti-fogging properties of a film is to hold a sheet of the film over an open water surface with the water heated to about 200° F. A film having the three ingredients according to the present invention shows excellent resistance to droplet condensation and, hence, fogging in such a test. Films prepared having fewer than all three of the ingredients of the present invention likewise show good droplet condensation resistance. However, the synergistic effect of the ingredients is shown by actual use where fresh meat is wrapped in packaging film, placed in a refrigerated display counter, and subjected to temperature cycling. Film according to the present invention does not show a tendency to fog after up to three days of shelf life in actual use tests. On the other hand, films having fewer than the three ingredients all tend to begin fogging between 15 minutes and 1 hour after wrapping.

Our above described invention is limited only by the scope of the following claims:

We claim:
1. An article comprising:
    (a) a polymer of an alpha-monolefin having 2 to 8 carbon atoms per molecule;
    (b) 0.25 to 4 weight percent of the reaction product of a $C_8$–$C_{18}$ alcohol and ethylene oxide;
    (c) 0.1% to 2% by weight of a $C_{12}$ to $C_{18}$ fatty acid monoester of polyhydric alcohol; and,
    (d) 0.05% to 0.75% by weight of an alkali metal salt of a $C_5$ to $C_{10}$ diester of sulfosuccinic alcohol.
2. The article of claim 1 wherein the olefin polymer is a polymer of ethylene.
3. The article of claim 2 wherein the alkali metal salt of a $C_5$ to $C_{10}$ diester of sulfosuccinic alcohol is sodium dioctyl sulfoccinate.
4. The article of claim 2 wherein the fatty acid monoester of polyhydric alcohol is glycerol monostearate.
5. The article of claim 2 wherein the fatty acid monoester of polyhydric alcohol is triglycerol monostearate.
6. The article of claim 2 wherein the reaction product of a $C_8$–$C_{18}$ alcohol and ethylene oxide is the reaction product of lauryl alcohol with 2 to 5 moles of ethylene oxide.
7. The article of claim 1 including less than 0.200 weight percent of a slip agent and less than 0.200 weight percent of an antiblock agent.
8. An antifogging polyethylene film comprising:
    (a) approximately 98 weight percent polyethylene;
    (b) approximately 1.0% eth-oxylated lauryl alcohol;
    (c) approximately 0.5 weight percent glyceryl monostearate; and,
    (d) approximately 0.375 weight percent sodium dioctyl sulfoccinate.
9. The antifogging film of claim 8 wherein the polyethylene has a density of approximately 0.922 gram per cubic centimeter.
10. The antifogging film of claim 9 including 0.080 weight percent of erucomide and 0.040 weight percent of highly divided silica gel.

References Cited
UNITED STATES PATENTS
2,561,010   7/1951   Carson.

ALLAN LIEBERMAN, Primary Examiner

S. L. FOX, Assistant Examiner

U.S. Cl. X.R.
260—33.2

UNITED STATES PATENT OFFICE
CERTIFICATE OF CORRECTION

Patent No. 3,541,040  Dated November 17, 1970

Inventor(s) Frank Elisha Eastes, Alfred Paul Engelmann, Samuel Ervin L

It is certified that error appears in the above-identified patent and that said Letters Patent are hereby corrected as shown below:

On Page 1 in Column 1 immediately below the title, the inventor's nam "Frank Edisha Eastes" should read--Frank Elisha Eastes--; in Line 9 o Claim 1 the term "sulfosuccinic alcohol" should read--sulfosuccinic acid--; and, in Line 2 of Claim 3 the term "sulfosuccinic alcohol" should read--sulfosuccinic acid--.

Signed and sealed this 4th day of May 1971.

(SEAL)
Attest:

EDWARD M. FLETCHER, JR.　　　　　　　　WILLIAM E. SCHUYLER, JR
Attesting Officer　　　　　　　　　　　　Commissioner of Patent